US011988741B2

(12) United States Patent
Somanath et al.

(10) Patent No.: US 11,988,741 B2
(45) Date of Patent: May 21, 2024

(54) VEHICLE ROUTING BASED ON AVAILABILITY OF RADAR-LOCALIZATION OBJECTS

(71) Applicant: Aptiv Technologies AG, Schaffhausen (CH)

(72) Inventors: Amith Somanath, Woodland Hills, CA (US); Mohamed A. Moawad, Westfield, IN (US); Michael H. Laur, Mission Viejo, CA (US); Nanhu Chen, Lafayette, IN (US); Aniello Sorrentino, Wuppertal (DE); Aron Sommer, Cologne (DE); Kai Zhang, Carmel, IN (US); Jakub Porebski, Cracow (PL); Krzysztof Kogut, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 151 days.

(21) Appl. No.: 17/313,973

(22) Filed: May 6, 2021

(65) Prior Publication Data
US 2022/0196830 A1     Jun. 23, 2022

Related U.S. Application Data

(60) Provisional application No. 63/146,483, filed on Feb. 5, 2021, provisional application No. 63/127,049, filed on Dec. 17, 2020.

(51) Int. Cl.
*G01S 13/931*     (2020.01)
*G01C 21/34*      (2006.01)
(Continued)

(52) U.S. Cl.
CPC ........ *G01S 13/931* (2013.01); *G01C 21/3415* (2013.01); *G01C 21/3658* (2013.01);
(Continued)

(58) Field of Classification Search
CPC .............. G01S 13/64; G01S 2013/932; G01S 2013/9321; G01S 13/931; G01C 21/3415; G01C 21/3658
See application file for complete search history.

(56) References Cited

U.S. PATENT DOCUMENTS 9,194,949 B2   11/2015   Becker et al.
9,562,778 B2   2/2017    Duhadway et al.
(Continued)

FOREIGN PATENT DOCUMENTS

DE   102012106932       5/2014
DE   102015002144 A1    8/2016
(Continued)

OTHER PUBLICATIONS

"Extended European Search Report", European Application No. 23162302.6, dated Sep. 18, 2023, 13 pages.
(Continued)

*Primary Examiner* — Marcus E Windrich
(74) *Attorney, Agent, or Firm* — Harness, Dickey & Pierce, P.L.C.

(57) ABSTRACT

Methods and systems are described that enable vehicle routing based on availability of radar-localization objects. A request to navigate to a destination is received, and at least two possible routes to the destination are determined. Availabilities of radar-localization objects for the possible routes are determined, and a route is selected based on the availabilities of the radar-localization objects. Furthermore, while traveling along a route, the vehicle is localized based on radar detections of radar-localization objects. A radar-localization quality of the localizing is monitored, and a determination is made that the radar-localization quality has dropped or will drop. Based on the radar-localization quality dropping, the route is modified and/or an operation of a radar module is adjusted. In this way, availabilities of radar-
(Continued)

localization objects may be used to select an optimal route and to adjust a current navigation along a route to minimize driver takeover.

18 Claims, 9 Drawing Sheets

(51) Int. Cl.
  *G01C 21/36* (2006.01)
  *G01S 13/64* (2006.01)
(52) U.S. Cl.
  CPC ......... *G01S 13/64* (2013.01); *G01S 2013/932* (2020.01); *G01S 2013/9321* (2013.01)

(56) References Cited

U.S. PATENT DOCUMENTS

| | | | |
|---|---|---|---|
| 9,594,378 | B2 | 3/2017 | Laur et al. |
| 10,106,153 | B1 | 10/2018 | Xiao et al. |
| 10,345,107 | B2 | 7/2019 | Laur |
| 10,962,372 | B1* | 3/2021 | Rao ................... G01C 21/3484 |
| 2012/0310504 | A1 | 12/2012 | Duhadway et al. |
| 2013/0103298 | A1 | 4/2013 | Becker et al. |
| 2015/0022392 | A1 | 1/2015 | Hegemann et al. |
| 2015/0353083 | A1 | 12/2015 | Hasberg et al. |
| 2018/0051998 | A1* | 2/2018 | Stephens ............. G08G 1/0129 |
| 2018/0080785 | A1* | 3/2018 | Han ................... G01C 21/3492 |
| 2018/0088574 | A1* | 3/2018 | Latotzki ............ B60W 60/0057 |
| 2018/0188037 | A1 | 7/2018 | Wheeler et al. |
| 2018/0325012 | A1 | 11/2018 | Ferrari et al. |
| 2018/0365908 | A1* | 12/2018 | Liu ........................ G05D 1/005 |
| 2019/0196008 | A1* | 6/2019 | Lee ......................... G01S 7/411 |
| 2019/0376807 | A1* | 12/2019 | Iagnemma ......... G01C 21/3461 |
| 2020/0101974 | A1* | 4/2020 | Ha ...................... G01C 21/3492 |
| 2020/0124422 | A1* | 4/2020 | Lin Sörstedt ........ G05D 1/0246 |
| 2020/0217943 | A1 | 7/2020 | Pishehvari et al. |
| 2020/0348408 | A1 | 11/2020 | Peng et al. |
| 2021/0033411 | A1* | 2/2021 | Violetta ............. G01C 21/3484 |
| 2021/0163021 | A1* | 6/2021 | Frazzoli .................... G01D 3/10 |
| 2022/0135071 | A1* | 5/2022 | Smith ................... B60W 10/04 701/25 |
| 2022/0197301 | A1 | 6/2022 | Moawad et al. |
| 2022/0198929 | A1 | 6/2022 | Dudar et al. |
| 2023/0080061 | A1* | 3/2023 | Wang ................... H04N 19/105 375/240.02 |

FOREIGN PATENT DOCUMENTS

| | | |
|---|---|---|
| DE | 102016003934 A1 | 10/2017 |
| DE | 102017214012 A1 | 2/2019 |
| DE | 102018218182 A1 | 4/2020 |
| EP | 3517996 A1 | 7/2019 |
| EP | 3671546 A1 | 6/2020 |

OTHER PUBLICATIONS

"Extended European Search Report", EP Application No. 20193680.4, dated Feb. 18, 2021, 9 pages.
Bouzouraa, "Fusion of Occupancy Grid Mapping and Model Based Object Tracking for Driver Assistance Systems using Laser and Radar Sensors", Jun. 2010, pp. 294-300.
Guidolini, et al., "Removing Movable Objects from Grid Maps of Self-Driving Cars Using Deep Neural Networks", Jul. 2019, 8 pages.
Sahdev, "Free Space Estimation Using Occupancy Grids and Dynamic Object Detection", Aug. 2017, 10 pages.
Abdelgalil, et al., "Multi-Robot SLAM: An Overview", Jan. 2019, 11 pages.
Holder, et al., "Real-Time Pose Graph SLAM based on Radar", Jun. 2019, 7 pages.
Javanmardi, "Autonomous vehicle self-localization based on abstract map and multichannel LiDAR in urban area", May 2018, 13 pages.
Li, et al., "Environment Mapping and Vehicle Localization with a High-Resolution Radar Prototype", Sep. 2019, 9 pages.
Pettersson, et al., "Estimation of Local Map from Radar Data", Masters Thesis, 2014—Retrieved at: http://liu.diva-portal.org/smash/get/diva2:761904/FULLTEXT01.pdf, 2014, 101 pages.
Pishehvari, et al., "Radar Scan Matching Using Navigation Maps", Feb. 2019, 8 pages.
Poggenhans, et al., "Precise Localization in High-Definition Road Maps for Urban Regions", Oct. 2018, 8 pages.
Saarinen, et al., "Normal Distributions Transform Occupancy Maps: Application to Large-Scale Online 3D Mapping", May 2013, pp. 2233-2238, 6 pages.
Schoen, et al., "Real-Time Radar SLAM", Jan. 2017, 10 pages.
Ward, et al., "Vehicle localization with low cost radar sensors", Jun. 2016, 8 pages.
"Atari 1040 ST Bedienungshandbuch", Jan. 1, 1987, 95 pages.
"Extended European Search Report", EP Application No. 21209134.2, dated May 12, 2022, 10 pages.
"Extended European Search Report", EP Application No. 21209674.7, dated May 13, 2022, 10 pages.
"Extended European Search Report", EP Application No. 21210140.6, dated Aug. 22, 2022, 12 pages.
"Extended European Search Report", EP Application No. 21210142.2, dated Aug. 23, 2022, 11 pages.
"Partial European Search Report", EP Application No. 21210140.6, dated May 20, 2022, 16 pages.
"Partial European Search Report", EP Application No. 21210142.2, dated May 23, 2022, 13 pages.
"Sinclair ZX81 Personal Computer", Retrieved from: https://www.zock.com/8-Bit/D_ZX81.HTML, Jan. 1, 1983, 4 pages.
"Smart Summon", Tesla Model 3 Owner's Manual, Retrieved from https://www.tesla.com/ownersmanual/model3/en_nz/GUID-6B9A1AEA-579C-400E-A7A6-E4916BCD5DED.html on Mar. 7, 2022, 6 pages.
Almalioglu, et al., "Milli-RIO: Ego-Motion Estimation with Low-Cost Millimetre-Wave Radar", Mar. 6, 2020, 9 pages.
Bruns, "Lidar-based Vehicle Localization in an Autonomous Valet Parking Scenario", Thesis, The Ohio State University, 2016, 57 pages.
Einsiedler, et al., "Vehicle Indoor Positioning: A Survey", Oct. 2017, 6 pages.
Hanke, et al., "Virtual Sensorics: Simulated Environmental Perception for Automated Driving Systems", Jul. 9, 2020, 119 pages.
Klemm, et al., "Autonomous Multi-Story Navigation for Valet Parking", 2016 IEEE 19th International Conference on Intelligent Transportation Systems (ITSC), 2016, 8 pages.
Li, et al., "Extracting General-Purpose Features from LIDAR Data", 2010 IEEE International Conference on Robotics and Automation, May 3, 2010, 6 pages.
Mahmoud, et al., "Parking Map Generation and Tracking Using Radar—Adaptive Inverse Sensor Model", Jun. 29, 2020, 71 pages.
Markiewicz, et al., "Developing Occupancy Grid with Automotive Simulation Environment", Oct. 29, 2020, 16 pages.
Qin, et al., "AVP-SLAM: Semantic Visual Mapping and Localization for Autonomous Vehicles in the Parking Lot", 2020 IEEE/RSJ International Conference on Intelligent Robots and Systems (IROS), Oct. 2020, pp. 5939-5945.
Schuster, et al., "Robust Localization based on Radar Signal Clustering", Jun. 19, 2016, pp. 839-844.
Song, et al., "Floorplan-based Localization and Map Update Using LiDAR Sensor", 2021 18th International Conference on Ubiquitous Robots (UR), Jul. 2021, pp. 30-34.
Varjotie, et al., "Accuracy analysis of scan registration in Normal Distributions Transform based simultaneous localization and mapping using radar and laser scanning", Jun. 26, 2019, 71 pages.
Zhu, et al., "Reference Map Generation Techniques for Radar Scene Matching Guidance: An Overview", Mar. 1, 2009, 4 pages.

* cited by examiner

VEHICLE ROUTING BASED ON AVAILABILITY OF RADAR-LOCALIZATION OBJECTS

CROSS-REFERENCE TO RELATED APPLICATIONS

This application claims the benefit under 35 U.S.C. 119(e) of U.S. Provisional Application No. 63/146,483, filed Feb. 5, 2021, and U.S. Provisional Application No. 63/127,049, filed Dec. 17, 2020, the disclosures of which are incorporated by reference in their entireties herein.

BACKGROUND

Radar localization is a technique of using radar reflections to localize a vehicle to a map (e.g., determining a location of the vehicle on the map). Radar-localization is often used to support autonomous vehicle operations (e.g., navigation, path planning, lane determination and centering, and curve execution without lane markers). In order to accurately position the vehicle relative to its environment, radar-localization includes obtaining reflections from stationary localization objects (e.g., signs, poles, barriers, landmarks, buildings, overpasses, curbs, road-adjacent objects such as fences, trees, flora, and foliage, or spatial statistical patterns) with known locations on the map (e.g., locations in a Universal Transverse Mercator or UTM frame). Availability of such localization objects may not be consistent across different routes to a destination and their detectability may diminish along a route due to unforeseen circumstances. When an availability of localization objects is not sufficient, a driver takeover is often initiated, which overrides semi-autonomous or fully autonomous controls. Increased driver takeovers may be less safe, and their frequent happenings can decrease driver satisfaction compared to when a vehicle operates under autonomous control.

SUMMARY

Aspects described below include methods, performed by a vehicle, of vehicle routing based on availability of radar-localization objects. The methods include receiving a request to navigate to a destination and determining at least two possible routes to the destination from a current location of the vehicle. The methods further include determining respective availabilities of radar-localization objects for the possible routes and selecting the route from the possible routes based on the respective availabilities of the radar-localization objects.

The methods also include maneuvering to the destination via a route. While maneuvering, the methods include localizing the vehicle based on radar detections of radar-localization objects. The methods further include monitoring a radar-localization quality of the localizing and determining that the radar-localization quality has dropped below a threshold or that the radar-localization quality will drop below the threshold. The methods include modifying the route or sending a change request to a radar module of the vehicle to adjust an operation of the radar module.

Aspects described below also include a system for vehicle routing based on availability of radar-localization objects. The system comprises a radar module configured to provide radar detections of objects proximate to the vehicle. The system also comprises at least one processor and at least one computer-readable storage medium comprising instructions that, when executed by the processor, cause the system to implement a route-selection module configured to determine a route to a destination. In order to do so, the route-selection module receives a request to navigate to the destination and determines at least two possible routes to the destination from a current location of the vehicle. The route-selection module then determines respective availabilities of radar-localization objects for the possible routes and selects the route from the possible routes based on the respective availabilities of the radar-localization objects.

The instructions further cause the system to implement a radar-localization module configured to adjust a navigation of the vehicle. The radar-localization module receives radar detections of radar-localization objects from the radar module and localizes the vehicle to a route based on the radar detections of the radar-localization objects. The radar-localization module also monitors a radar-localization quality of the localizing and determines that the radar-localization quality has dropped below a threshold or that the radar-localization quality will drop below the threshold. The radar-localization module then modifies the route or sends a change request to the radar module to adjust an operation of the radar module. Thereby, particularly when operating a vehicle that is driven at least partially under automated control, driving safety and passenger comfort and convenience can be improved.

BRIEF DESCRIPTION OF THE DRAWINGS

Systems and techniques enabling vehicle routing based on availability of radar-localization objects are described with reference to the following drawings. The same numbers are used throughout the drawings to reference like features and components.

DETAILED DESCRIPTION

Overview

Radar localization is a technique of using radar reflections to localize a vehicle relative to stationary objects (e.g., objects or spatial statistical patterns). One application of radar-localization is localizing a vehicle to a map, similar to geospatial positioning systems (e.g., GPS, GNSS, GLO- NASS). Just as those positioning systems require adequate signal reception, radar-localization requires radar reflections from radar-localization objects with known locations.

One aspect of vehicle navigation is route determination (e.g., using a map to select a route to a destination). Traditional route determination is based on minimizing times or distances to destinations. With the advancement of semi-autonomous and autonomous driving abilities, time or distance may not be a driving factor for route selection. For example, a route may comprise a shorter distance or time to a destination but require more driver takeover. By failing to account for driver takeover, conventional navigation systems often select non-optimal routes, or routes that are less desirable for a passenger who would rather drive the vehicle with little to no manual control.

Another problem occurs when a radar-localization quality diminishes due to predicted or unforeseen circumstances. For example, when traveling along a route, the radar-localization objects may become sparse (e.g., because of weather) or occluded by an object that the vehicle was not expecting (e.g., a large truck traveling adjacent to the vehicle). In these situations, conventional systems often initiate a driver takeover, which decreases safety and driver satisfaction.

Methods and systems are described that enable vehicle routing based on availability of radar-localization objects. A request to navigate to a destination is received, and at least two possible routes to the destination from a current location of the vehicle are determined. Respective availabilities of radar-localization objects for the possible routes are determined, and a route is selected from the possible routes based on the respective availabilities of the radar-localization objects. The vehicle then travels along a route. While traveling, radar detections of radar-localization objects are received from a radar module, and the vehicle is localized to the route based on the radar detections of the radar-localization objects. A radar-localization quality of the localizing is monitored, and a determination is made that the radar-localization quality has dropped below a threshold or that the radar-localization quality will drop below the threshold. The route is then modified, or a change request is sent to the radar module to adjust an operation of the radar module. In this way, availabilities of radar-localization objects may be used to select a route and adjust a current navigation along a route to minimize driver takeover.

Example Illustrations

Figure 1:
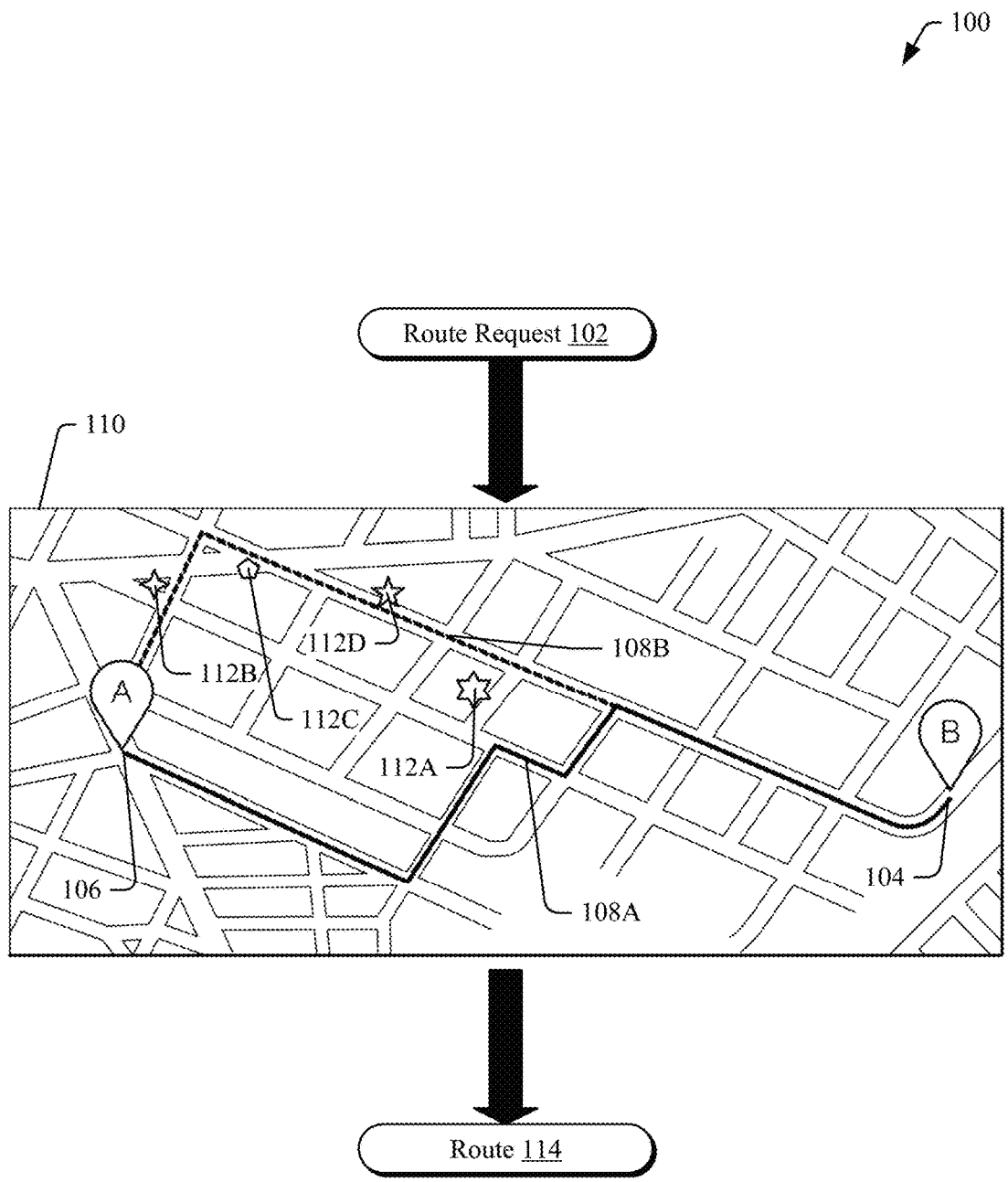
FIG. 1 illustrates an example route selection based on availability of radar-localization objects, in accordance with techniques of this disclosure.

FIG. 1 is an example illustration 100 of route selection based on availability of radar-localization objects. The route selection is generally implemented by a route-selection module 410 of a system 402 of a vehicle 404, which is discussed further in regard to FIGS. 4 and 5.

A route request 102 is received by the system 402 to navigate to a destination 104 from a current position 106 of the vehicle 404. A first possible route 108A and a second possible route 108B are determined using a radar-localization map 110. The radar-localization map 110 may contain multiple layers. For example, the radar-localization map 110 may have a road layer for use in determining the possible routes 108, a radar-localization layer containing radar-localization objects 112, and other data in one or more other layers for determining other features of an environment traveled by the vehicle 404. Again, the radar-localization objects 112 may comprise one or more of signs, poles, barriers, landmarks, buildings, overpasses, curbs, or road-adjacent foliage and associated information. Furthermore, the radar-localization objects 112 may comprise statistical patterns (e.g., Gaussian representations of occupancy) that are not necessarily of particular objects. In other words, the radar-localization map 110 may comprise a collection of Gaussians corresponding to areas of occupied spaces usable for radar-localization. Although two possible routes 108 are shown, any number of possible routes 108 may be determined.

In the example illustration 100, the first possible route 108A has a single radar-localization object 112 along its path (e.g., radar-localization object 112A). The second possible route 108B, however, has a plurality of radar-localization objects 112 along its path (e.g., radar-localization objects 112B-D in addition to radar-localization object 112A). Using the availability of the radar-localization objects 112 (e.g., number or density) along the possible routes 108, the system 402 selects a route 114 from the possible routes 108. In the example illustration 100, the route 114 may correspond to possible route 108B because it contains more radar-localization objects 112. Selection of the route 114 is discussed further in regard to FIG. 5.

By selecting the route 114 based on the availability of the radar-localization objects 112, an amount of driver takeover can be reduced relative to conventional route-selection methods. Consequently, safety can be increased and driver satisfaction improved relative to those conventional methods.

Figure 2:
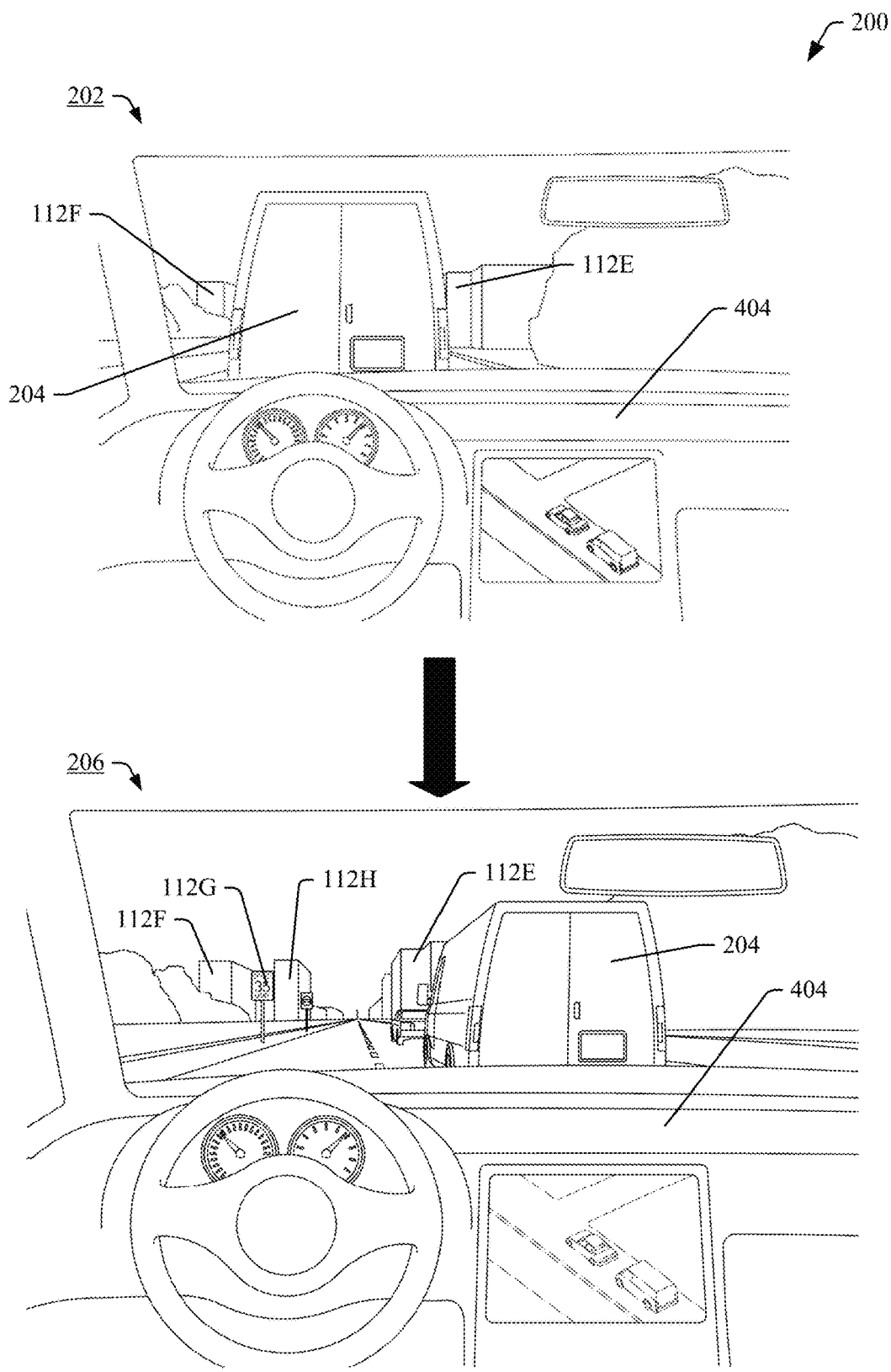
FIG. 2 illustrates an example route modification based on availability of radar-localization objects, in accordance with techniques of this disclosure.

FIG. 2 is an example illustration 200 of route modification based on availability of the radar-localization objects 112. The route modification is generally implemented by a radar-localization module 412 and the route-selection module 410 of the system 402, which are discussed further in regard to FIGS. 4 and 6.

The example illustration 200 shows the vehicle 404 traveling along a route 202. The route 202 is generally (although not required) a lane-level route. While traveling along the route 202, a radar-localization quality 602 is monitored. The radar-localization quality 602 may be indicative of a quantity of detected radar-localization objects 112, signal qualities of the associated radar reflections, alignment with radar-localization objects 112, occlusion of radar-localization objects 112 by weather, occlusion of radar-localization objects 112 from vehicles, seasonal differences in statistical patterns of radar-localization objects 112 or other factors that may affect radar localization. The radar-localization quality 602 is discussed further in regard to FIGS. 6 and 7.

At some point along the route 202, a determination is made that the radar-localization quality 602 has dropped below a threshold or that the radar-localization quality will drop below the threshold. For example, when traveling along the route 202, a radar occlusion 204 may appear that blocks a field of view of a radar module 414 of the system 402, which is discussed further in regard to FIGS. 3, 4, and 7. In the example illustration 200, the radar occlusion 204 is a truck or van proximate to the vehicle 404. With the radar occlusion 204 present, radar-localization may only occur based on detections of radar-localization objects 112E and 112F.

In order to improve the radar-localization quality 602, the route 202 is changed to an updated route 206. In the example illustration 200, the updated route 206 comprises a different lane than the route 202. The updated route 206 may alternatively or additionally comprise a change in path, speed, or orientation relative to the route 202. As shown, the updated route 206 enables a field of view of additional radar-localization objects 112G and 112H. Accordingly, by updating the route 202 to updated route 206, the radar-localization quality 602 may be improved, thereby obviating a driver takeover.

Figure 3:
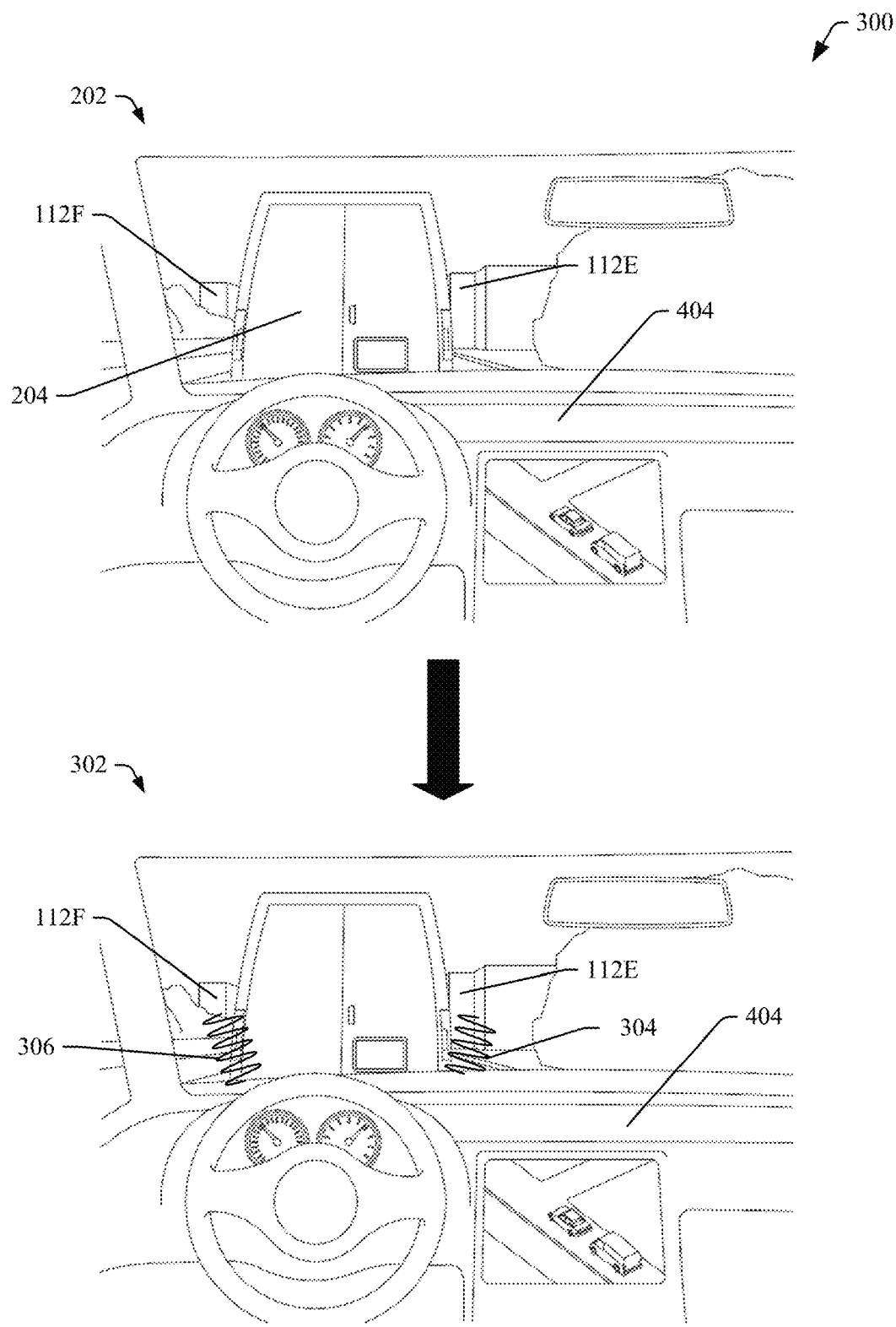
FIG. 3 illustrates an example radar module modification based on availability of radar-localization objects, in accordance with techniques of this disclosure.

FIG. 3 is an example illustration 300 of a modification of the radar module 414 based on availability of the radar-localization objects 112. The radar module modification is generally implemented by the radar-localization module 412 and a radar module 414 of the system 402, which are discussed further in regard to FIGS. 4 and 7.

The example illustration 300 shows the vehicle 404 traveling along the route 202. Similar to the example illustration 200, a determination is made that the radar-localization quality 602 has dropped below a threshold or that the radar-localization quality 602 will drop below the threshold. Instead of adjusting the route 202, as in example illustration 200, in example illustration 300, a radar field produced by the radar module 414 and/or an object tracking performed by the radar module 414 are modified to create updated radar-field/object tracking 302.

The updated radar-field/object tracking 302 may contain beams 304 and 306 focused on radar-localization objects 112E and 112F, respectively. In some implementations, the updated radar-field/object tracking 302 may correspond to an azimuth or elevation mode or a long-range or short-range mode (e.g., to better focus on radar-localization objects 112E and 112F). In other implementations, the updated radar-field/object tracking 302 track radar-localization objects 112E and 112F (e.g., with more sampling than normal). Furthermore, in some implementations, the updated radar-field/object tracking 302 may comprise accumulating radar reflections in a radar occupancy grid using dynamic accumulation times. In so doing, the radar-localization quality 602 may be improved without necessitating reflections from additional radar-localization objects, thereby obviating a driver takeover.

Example System

Figure 4:
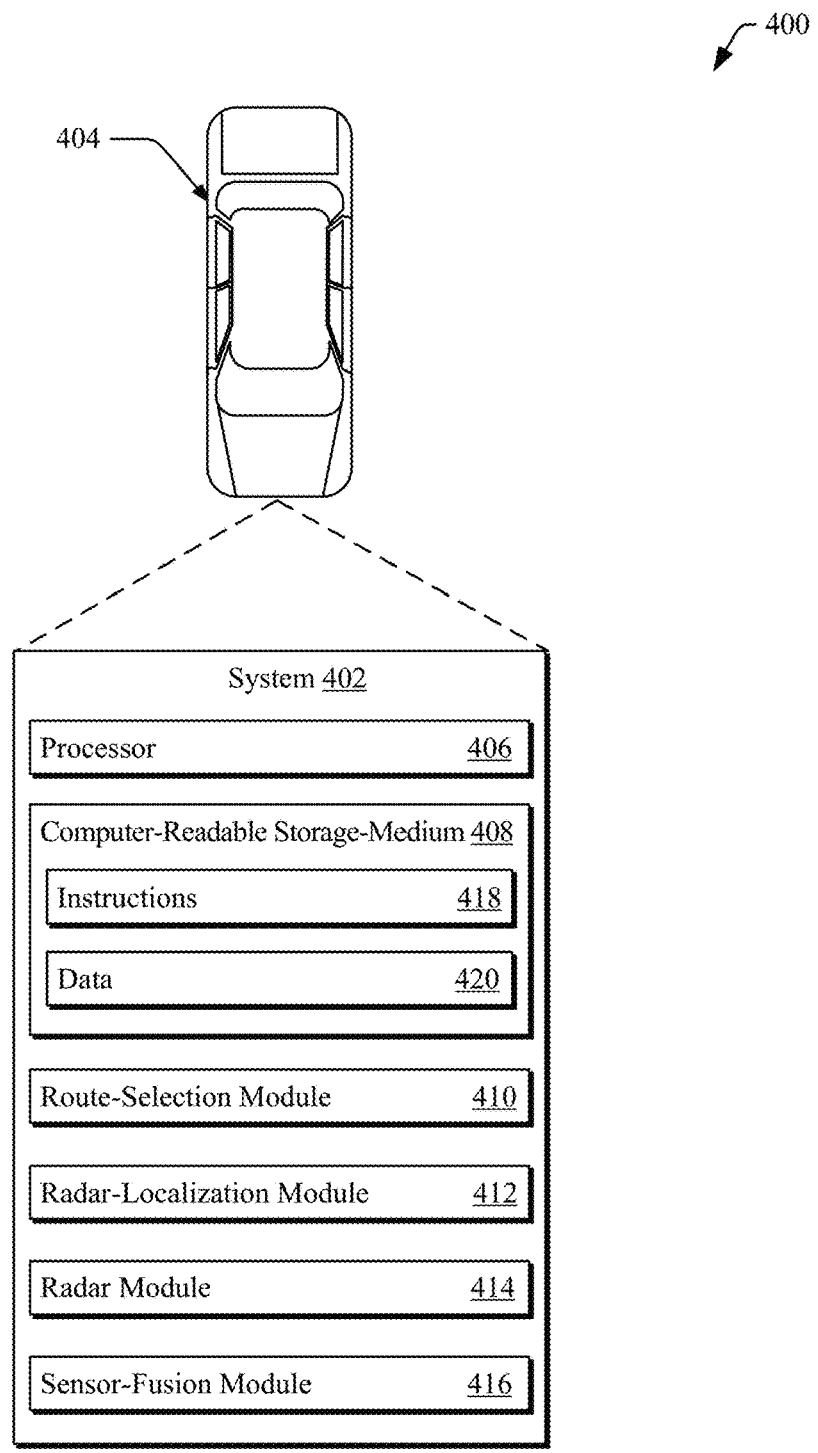
FIG. 4 illustrates an example system configured to perform vehicle routing based on availability of radar-localization objects.

FIG. 4 is an example illustration 400 of the system 402 in which vehicle routing based on availability of the radar-localization objects 112 can be implemented. The system 402 is generally implemented in the vehicle 404. Although the vehicle 404 is illustrated as a car, the vehicle 404 may comprise any vehicle (e.g., a truck, a bus, a boat, a plane, etc.) without departing from the scope of this disclosure. As shown underneath, the system 402 includes at least one processor 406, at least one computer-readable storage medium 408, the route-selection module 410, the radar-localization module 412, the radar module 414, and a sensor-fusion module 416.

The processor 406 (e.g., an application processor, microprocessor, digital-signal processor (DSP), or controller) executes instructions 418 (e.g., code) stored within the computer-readable storage medium 408 (e.g., a non-transitory storage devices such as a hard drive, SSD, flash memory, read-only memory (ROM), EPROM, or EEPROM) to cause the system 402 to perform the techniques described herein. The instructions 418 may be part of an operating system and/or one or more applications of the system 402.

The instructions 418 cause the system 402 to act upon (e.g., create, receive, modify, delete, transmit, or display) data 420 (e.g., application data, module data; sensor data, or I/O data). Although shown as being within the computer-readable storage medium 408, portions of the data 420 may be within a random-access memory (RAM) or a cache of the system 402 (not shown). Furthermore, the instructions 418 and/or the data 420 may be remote to the system 402.

The route-selection module 410, the radar-localization module 412, the radar module 414, and the sensor-fusion module 416 (or portions thereof) may be comprised by the computer-readable storage medium 408 or be stand-alone components (e.g., executed in dedicated hardware in communication with the processor 406 and computer-readable storage medium 408). For example, the instructions 418 may cause the processor 406 to implement or otherwise cause the system 402 to implement the methods described in regard to FIGS. 1-3 and 5-9.

The radar module 414 and the sensor-fusion module 416 may contain or otherwise be in communication with sensors. For example, the radar module 414 may contain or communicate with one or more radar sensors (e.g., radar transmitters and receivers), and the sensor-fusion module may contain or communicate with other sensors (e.g., cameras, LIDAR, or GNSS).

Example Data Flows

Figure 5:
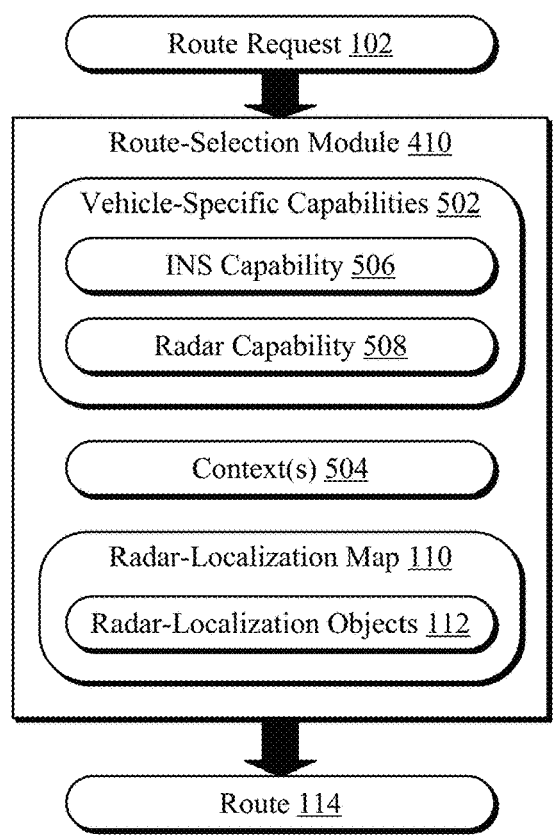
FIG. 5 illustrates an example data flow of route selection based on availability of radar-localization objects.

FIG. 5 is an example illustration 500 of a data flow of selecting the route 114 based on availability of the radar-localization objects 112. The example illustration 500 corresponds to the example illustration 100. The route-selection module 410 receives the route request 102 and determines the route 114 from the possible routes 108 based on the radar-localization objects 112 within the radar-localization map 110 and vehicle-specific capabilities 502 of the vehicle 404. One or more contexts 504 may also be used to determine the route 114.

When evaluating the possible routes 108 corresponding to the route request 102, the route-selection module 410 may obtain or otherwise determine the vehicle-specific capabilities 502. The vehicle-specific capabilities 502 are indicative of how well the system 402 can localize itself. For example, the vehicle-specific capabilities 502 may include an inertial navigation system (INS) capability 506 and a radar capability 508.

The INS capability 506 may be indicative of how well the system 402 can localize itself without radar-localization (e.g., an ability to maintain lateral and longitudinal localization). The INS capability 506 is based on an INS system of the vehicle, that may include one or more of a GNSS, gyro, accelerometer, magnetometer, software positioning engine, wheel tick sensor, lidar odometer, vision odometer, radar odometer, or other sensor odometer. For example, if the vehicle 404 has a very accurate INS system and therefore a high INS capability 506, the vehicle 404 may be able to traverse longer distances without radar localization.

The radar capability 508 is indicative of how sensitive or accurate the radar module 414 is in radar localization. The radar capability 508 may be an effective range, accuracy, or resolution of tracking radar-localization objects 112 (e.g., by radar module 414). The radar capability 508 is indicative of how sparse the radar-localization objects 112 may be while still obtaining an accurate localization. Furthermore, the radar capability 508 may be indicative of various available modes of the radar module 414. Both the INS capability 506 and the radar capability 508 affect a necessary density or distance between the radar-localization objects 112 for accurate localization.

The contexts 504 may also affect route selection. For example, the contexts 504 may comprise one or more of environments of the possible routes 108, traffic conditions of the possible routes 108, weather, a time of year, or a time of day. While some of these factors are conventionally used with respect to times to the destination for route selection, some of contexts 504 are specific to radar-localization. For example, urban areas may have higher densities of radar-localization objects 112 than rural areas; some localization objects may have diminished reflection characteristics in rain, snow, sleet, or season. Furthermore, larger bounding boxes may be needed around vegetation during heavy foliage months. When foliage is used for localization, substantial changes in foliage determine when to include foliage bounding boxes or to not include.

As discussed above, the radar-localization objects 112 are not uniformly distributed within the radar-localization map 110. Thus, an availability of the radar-localization objects 112 along each of the possible routes 108 (as shown in FIG. 1) is used to select the route 114. Along with the radar-localization objects 112 along each of the possible routes 108A, the vehicle-specific capabilities 502 and any contexts 504 associated with the possible routes 108A or the route request 102 are used to select the route 114.

In some implementations, the various factors for route selection may be weighed (e.g., weighted sum or average) to determine the route 114. For example, the route 114 may be selected based on minimizing driver takeover at the expense of a time to a destination. In some implementations, options may be presented to a driver such that the driver can select the route 114 from a list of the possible routes 108 based on time, distance, and estimated driver takeover. In other implementations, a driver may provide a general preference for less driver takeover (e.g., more localization objects) at the expense of time or distance. By using these techniques, an optimal route based on availability of radar-localization objects 112 may be selected.

Figure 6:
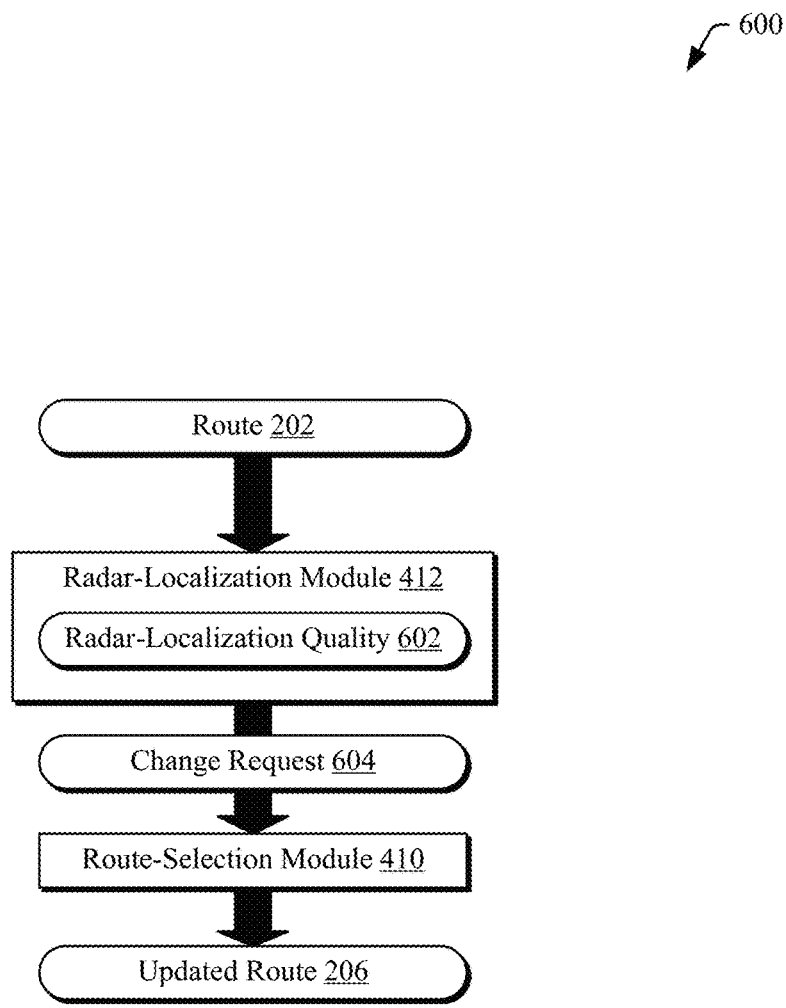
FIG. 6 illustrates an example data flow of route modification based on availability of radar-localization objects.

FIG. 6 is an example illustration 600 of a data flow of updating the route 202 to the updated route 206 based on availability of the radar-localization objects 112. The example illustration 600 corresponds to the example illustration 200.

The radar-localization module 412 monitors the radar-localization quality 602 along the route 202. The route 202 may be the route 114, a route to another destination, or a no-destination route. A no-destination route is a route on a current road or highway. For example, because the route-selection module 410 contains or otherwise has access to the radar-localization map 110, an optimal route (e.g., lane choice or speeds) on a current road over the electronic horizon (e-horizon) can be established. In other words, a no-route destination is a form of advanced cruise-control.

The radar-localization quality 602 is indicative of an ability of the radar-localization module 412 to localize the vehicle. For example, a drop in the radar-localization quality 602 may be due to a stretch of the route with sparse radar-localization objects 112 or because of the radar occlusion 204. Furthermore, the radar-localization module 412 may predict the drop in the radar-localization quality 602 be based on a current or predicted motion of the vehicle 404 and/or a current or predicted motion of the radar occlusion 204. Either way, the radar-localization module 412 may send a change request 604 to the route-selection module 410 to modify the route 202 to the updated route 206.

As shown in example illustration 200, the updated route 206 may be a different lane than a current lane. The updated route 206 may stay in the different lane for a pre-determined time or distance, assuming that the current lane has a better availability of the radar-localization objects 112.

In some implementations, the radar-localization quality 602 may be unexpected and also not caused by the radar occlusion 204. For example, the route-selection module 410 may determine the route 202 based on radar-localization objects 112 that no longer exist. In such a case, the route-selection module may change the route 202 completely (e.g., use different roads).

Responsive to determining that the radar-localization quality 602 has dropped below a threshold (e.g., an amount, percentage, or accuracy) or that the radar-localization quality 602 will drop below the threshold (e.g., based on a prediction), the route-selection module 410 selects the updated route 206 (e.g., via the change request 604). The updated route 206 may comprise a change in lane, path, speed, or orientation relative to the route 202. In this way, routes may be dynamically adjusted based on unforeseen circumstances.

Figure 7:
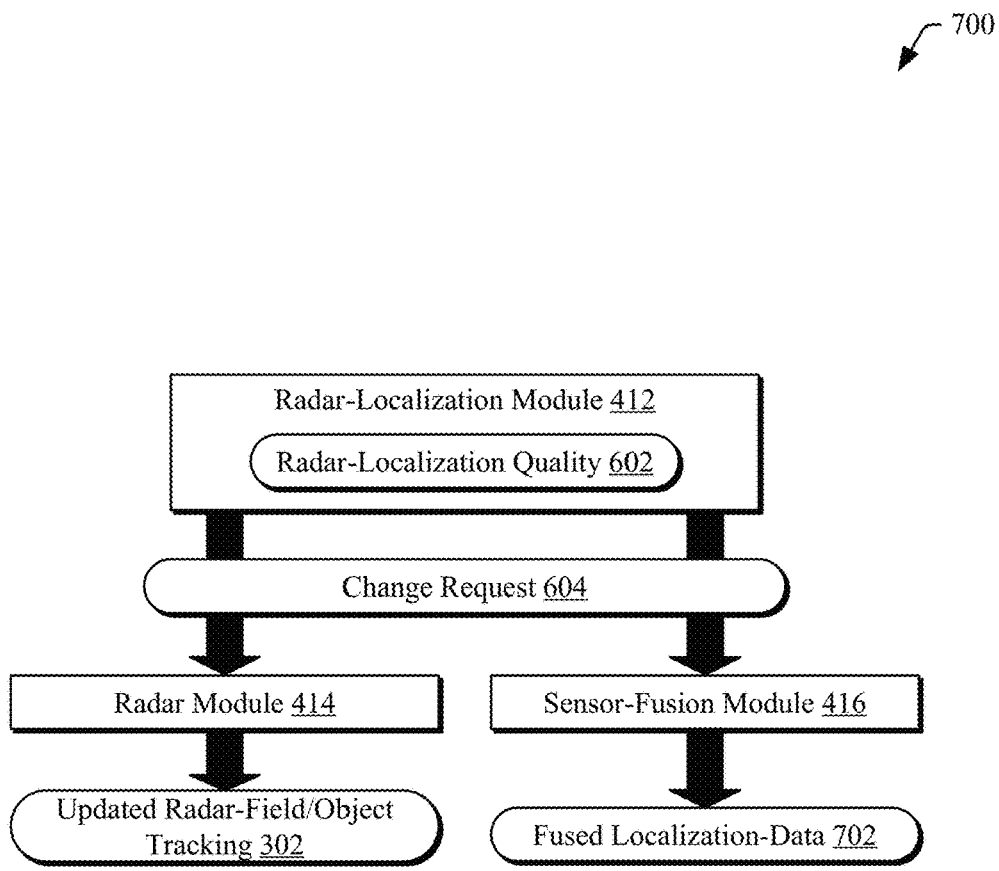
FIG. 7 illustrates an example data flow of changing operation of a radar module based on availability of radar-localization objects.

FIG. 7 is an example illustration 700 of a data flow of changing operation of the radar module 414 or the sensor-fusion module 416 based on availability of the radar-localization objects 112. The example illustration 700 corresponds to the example illustration 300.

Similar to example illustration 600, the change request 604 is generated responsive to determining that the radar-localization quality 602 has dropped. In example illustration 700, however, the change request 604 is sent to the radar module 414 and/or the sensor-fusion module 416. For example, the change request 604 may be sent to both the radar module 414 and the sensor-fusion module 416.

The radar module 414, responsive to receiving the change request 604, generates the updated radar-field/object tracking 302. For example, the radar module 414 may change a radar field generated by the radar module 414, a mode of the radar module 414 (e.g., to a short- or long-range mode or to a precise azimuth or elevation mode), or an object tracking. In order to adjust the object tracking, the radar-localization module 412 may determine which radar-localization objects 112 are being detected and send, as part of the change request 604, identifications of the radar-localization objects 112 to the radar module 414 such that the radar module 414 can focus on those radar-localization objects 112. The focusing may comprise a higher sampling rate of those radar-localization objects 112 or using directed radar beams towards those radar-localization objects 112 or an accumulation of detections in a radar occupancy grid.

The sensor-fusion module 416, responsive to receiving the change request 604, may attempt to localize the vehicle using other means. For example, the sensor-fusion module 416 may use lidar, camera, or GNSS data, in conjunction with the radar-localization performed by the radar-localization module 412 to generate fused localization-data 702. In such cases, the change request 604 may contain information about the radar-localization (e.g., known location information from the radar-localization module 412).

The techniques described in regard to FIGS. 3 and 7 may be used in conjunction with the techniques described in regard to FIGS. 2 and 6. As such, the change request 604 may be sent to the route-selection module 410, the radar module 414, and/or the sensor-fusion module 416. Depending on the recipient, the change request 604 may contain different information and/or instructions. Regardless of what is in the change request 604 or what entity it is sent to, the system 402 is able to dynamically adapt when the radar-localization quality 602 diminishes. In this way, additional driver takeover can be obviated.

Example Methods

Figure 8:
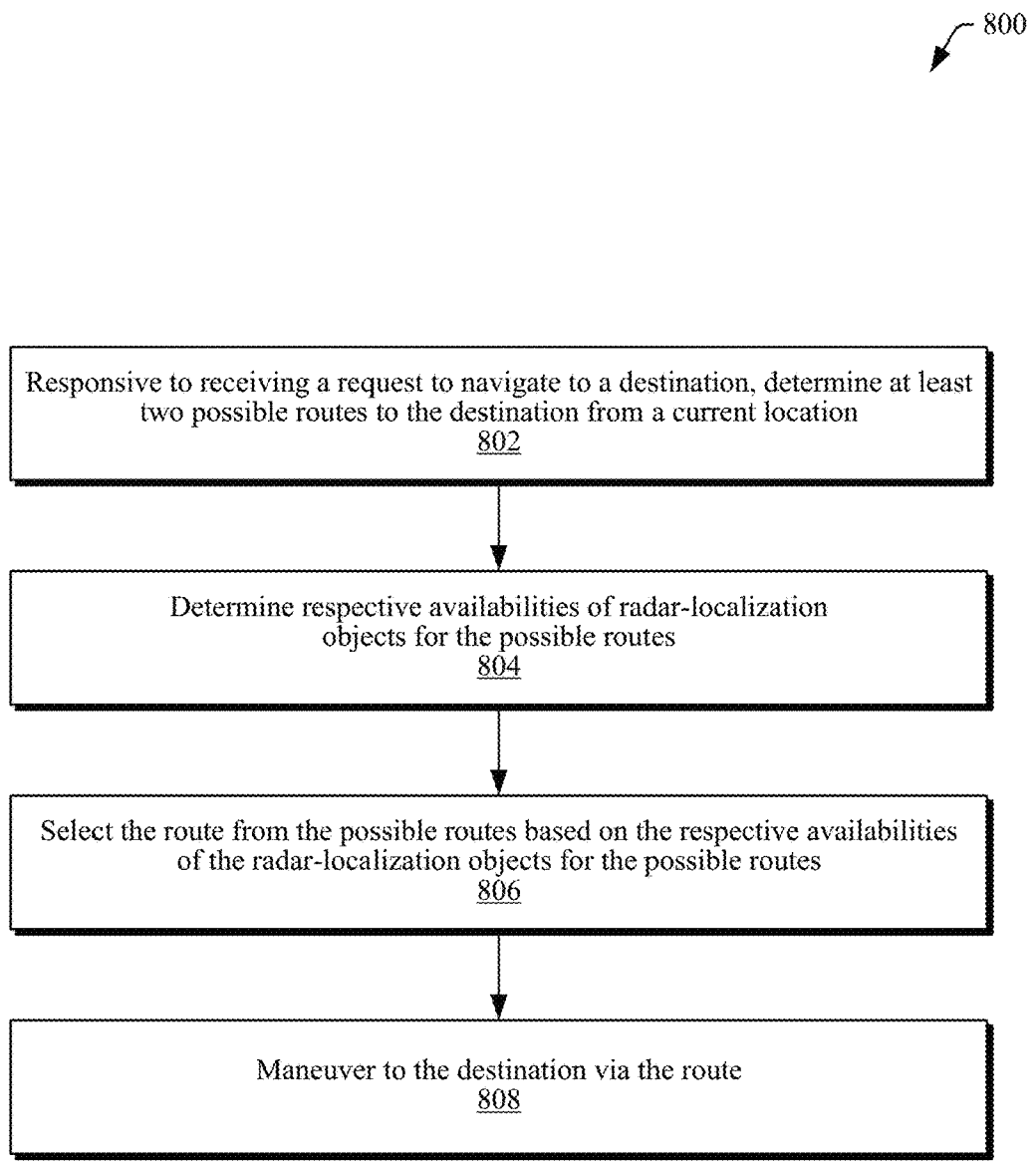
FIG. 8 illustrates an example method of selecting a route based on availability of radar-localization objects.

FIG. 8 illustrates an example method 800 for selecting a route based on availability of radar-localization objects. Example method 800 may be implemented utilizing the previously described examples, such as the example illustrations 100 and 500 and the system 402. Operations 802 through 808 may be performed by one or more entities (e.g., the route-selection module 410 or other modules or components of the system 402). The order in which the operations are shown and/or described is not intended to be construed as a limitation, and any number or combination of the operations can be combined in any order to implement the example method 800 or an alternate method.

The example method 800 generally starts, at 802, by a vehicle receiving a request to navigate to a destination and determining at least two possible routes to the destination from a current location. For example, the route-selection module 410 may use the radar-localization map 110 to determine the possible routes 108 from the current position 106 to the destination 104.

At 804, respective availabilities of radar-localization objects are determined for the possible routes. For example, the route-selection module 410 may determine a density or number of the radar-localization objects 112 along each of the possible routes 108. In some implementations, the route-selection module 410 may use the availability along each of the possible routes 108 to estimate numbers or times of driver takeover for each of the possible routes 108.

At 806, the route is selected from the possible routes based on the respective availabilities of the radar-localization objects for the possible routes. For example, the route-selection module 410 may evaluate the availabilities of the radar-localization objects 112 in light of the vehicle-specific capabilities 502 and select the route 114 from the possible routes 108 based on minimizing driver takeover. In some implementations, the route-selection module 410 may select a slower possible route 108 if it has less driver takeover than a faster possible route 108.

At 808, the vehicle maneuvers to the destination via the route. For example, the system 402 may maneuver the vehicle 404 in a semi-autonomous or autonomous way to the destination 104 via the route 114.

Figure 9:
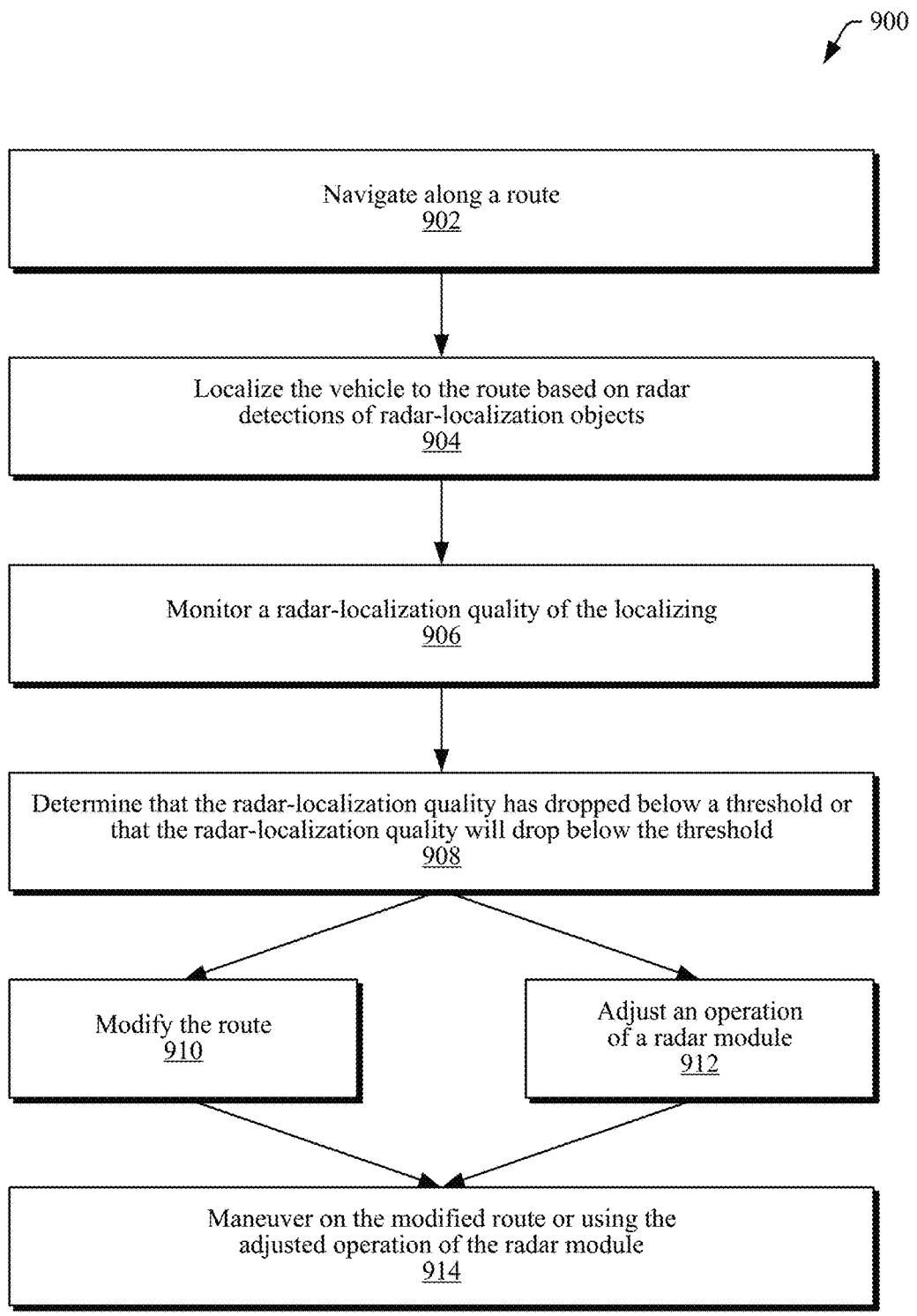
FIG. 9 illustrates an example method of modifying a route and/or changing an operation of a radar module based on availability of radar-localization objects.

FIG. 9 illustrates an example method 900 for adjusting a navigation based on availability of radar-localization objects. Example method 900 may be implemented utilizing the previously described examples, such as the example illustrations 200, 300, 600, and 700 and the system 402. Operations 902 through 908 may be performed by one or more entities (e.g., the radar-localization module 412, the radar module 414, the sensor-fusion module 416, or other modules or components of the system 402). The order in which the operations are shown and/or described is not intended to be construed as a limitation, and any number or combination of the operations can be combined in any order to implement the example method 900 or an alternate method.

The example method 900 generally starts, at 902, with a vehicle navigating along a route. For example, the system 402 may maneuver the vehicle 404 in a semi-autonomous or autonomous way along the route 202, which may be the route 114.

At 904, the vehicle localizes itself to the route based on radar detections of radar-localization objects. For example, the radar-localization module 412 may receive radar detections from the radar module 414 and determine that one or more of the detections are of radar-localization objects 112 with known locations. Using the detections of the radar-localization objects 112, the radar-localization module 412 may localize the vehicle 404 (e.g., determine a location of the vehicle 404) relative to the route 202.

At 906, a radar-localization quality of the localizing is monitored. For example, the radar-localization module 412 may determine how many radar-localization objects 112 are being tracked, a signal-to-noise ratio of the relevant reflections, or an accuracy of the radar-localization.

At 908, a determination is made that the radar-localization quality has dropped below a threshold or that the radar-localization quality will drop below the threshold along the route. For example, the radar-localization module 412 may determine that the radar-localization quality 602 has dropped a certain amount, percentage, or accuracy.

At 910, the route is modified. For example, the radar-localization module 412 may send the change request 604 to the route-selection module 410 to update the route 202 to the updated route 206. In some implementations, the updated route 206 may comprise a different lane. The updated route 206 may alternatively or additionally comprise a change in path, speed, or orientation relative to the route 202

Alternatively or in addition to 910, an operation of a radar module of the vehicle being used for the localization is adjusted. For example, the radar-localization module 412 may send the change request 604 to the radar module 414 to cause the radar module 414 to operate in a long- or short-range mode or an elevation or azimuth mode. The change request 604 may also be effective to cause the radar module 414 to increase sampling or focus on a certain radar-localization objects 112.

At 914, the vehicle is maneuvered on the modified route or using the adjusted operation of the radar module. For example, the system 402 may maneuver the vehicle 404 in a semi-autonomous or autonomous way via the updated route 206 or using the updated radar-field/object tracking 302.

EXAMPLES

Example 1: A method comprising: selecting, by a vehicle, a route to a destination by at least: responsive to receiving a request to navigate to the destination, determining at least two possible routes to the destination from a current location of the vehicle; determining respective availabilities of radar-localization objects for the at least two possible routes; and selecting the route from the at least two possible routes based on the respective availabilities of the radar-localization objects for the at least two possible routes; and maneuvering, by the vehicle, to the destination via the route.

Example 2: The method of example 1, further comprising determining respective quantities or lengths of estimated driver takeover for the at least two possible routes, wherein the selecting the route is based further on the respective quantities or lengths of the estimated driver takeover for the at least two possible routes.

Example 3: The method of example 2, further comprising determining respective travel times to the destination for the at least two possible routes, wherein the selecting the route is based further on weighted values of the respective quantities or lengths of the estimated driver takeover for the at least two possible routes and the respective travel times to the destination for the possible routes.

Example 4: The method of example 3, further comprising: displaying the respective quantities or lengths of the estimated driver takeover and travel times to the destination for the at least two possible routes; and receiving a user input selecting the route from the at least two possible routes, wherein the selecting the route is based further on the user input.

Example 5: The method of example 2, wherein the respective quantities or lengths of the estimated driver takeover are based on one or more vehicle-specific capabilities.

Example 6: The method of example 5, wherein the vehicle-specific capabilities include an inertial navigation capability indicative of how far or long the vehicle can travel without accurate radar-localization.

Example 7: The method of example 5, wherein the vehicle-specific capabilities include a radar capability indicative of an accuracy or range of radar-localization of the vehicle.

Example 8: The method of example 1, further comprising determining a context of the request or respective contexts of the at least two possible routes, the context of the request or respective contexts of the at least two possible routes comprising one or more of respective environments of the at least two possible routes, respective traffic conditions of the at least two possible routes, a time of year, or a time of day, wherein the selecting the route is based further on the context of the request or the respective contexts of the at least two possible routes.

Example 9: The method of example 1, wherein the maneuvering to the destination comprises maneuvering the vehicle to the destination in an autonomous or semi-autonomous mode.

Example 10: The method of example 1, wherein the maneuvering to the destination further comprises: localizing the vehicle to the route based on radar detections of radar-localization objects; monitoring a radar-localization quality of the localizing; determining that the radar-localization quality has dropped below a threshold or that the radar-localization quality will drop below the threshold along the route; and performing at least one of: modifying the route; or adjusting an operation of a radar module of the vehicle.

Example 11: A method comprising: adjusting, by a vehicle, a navigation of the vehicle by at least: navigating the vehicle along a route; localizing the vehicle to the route based on radar detections of radar-localization objects; monitoring a radar-localization quality of the localizing; determining that the radar-localization quality has dropped below a threshold or that the radar-localization quality will drop below the threshold along the route; and performing at least one of: modifying the route; or adjusting an operation of a radar module of the vehicle; and maneuvering, by the vehicle, on the modified route or using the adjusted operation of the radar module.

Example 12: The method of example 11, wherein the route is a no-destination route comprising an indefinite path along a current road or highway the vehicle is currently traveling on.

Example 13: The method of example 11, wherein the modifying the route comprises changing a current lane of the route or a speed of the vehicle.

Example 14: The method of example 11, wherein the determining that the radar-localization quality has dropped below the threshold or that the radar-localization quality will drop below the threshold along the route comprises determining that a radar occlusion exists proximate the vehicle.

Example 15: The method of example 14, wherein the radar occlusion is not a radar-localization object.

Example 16: The method of example 15, wherein the radar occlusion is another vehicle.

Example 17: The method of example 12, wherein the adjusting the radar module comprises setting the radar module to: a short-range or long-range mode; or a precise range or azimuth mode.

Example 18: The method of example 12, wherein the threshold is based on one or more vehicle-specific capabilities.

Example 19: The method of example 12, further comprising determining, by the vehicle, the route by at least: determining at least two possible routes; determining respective availabilities of radar-localization objects for the at least two possible routes; and selecting the route from the at least two possible routes based on the respective availabilities of the radar-localization objects for the at least two possible routes.

Example 20: A system implemented in a vehicle, the system comprising: a radar module configured to provide radar detections of objects proximate the vehicle; at least one processor; and at least one computer-readable storage-medium comprising instructions that, when executed by the at least one processor, implement: a route-selection module configured to select a route to a destination by at least: responsive to receiving a request to navigate to the destination, determining at least two possible routes to the destination from a current location of the vehicle; determining respective availabilities of radar-localization objects for the at least two possible routes; and selecting the route from the at least two possible routes based on the respective availabilities of the radar-localization objects for the at least two possible routes; and a radar-localization module configured to adjust a navigation of the vehicle by at least: receiving radar detections of radar-localization objects from the radar module; localizing the vehicle to the route based on the radar detections of the radar-localization objects; monitoring a radar-localization quality of the localizing; determining that the radar-localization quality has dropped below a threshold or that the radar-localization quality will drop below the threshold along the route; and performing at least one of: modifying the route; or adjusting an operation of the radar module.

Although implementations of vehicle routing based on availability of radar-localization objects have been described in language specific to certain features and/or methods, the subject of the appended claims is not necessarily limited to the specific features or methods described. Rather, the specific features and methods are disclosed as example implementations for vehicle routing based on availability of radar-localization objects. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:
1. A method comprising:
  selecting, by a vehicle, a route to a destination by at least:
    responsive to receiving a request to navigate to the destination, determining at least two possible routes to the destination from a current location of the vehicle;
    determining respective availabilities of radar-localization objects for the at least two possible routes, the radar-localization objects having corresponding locations on a map and being usable by the vehicle to localize itself relative to the map via radar reflections from the radar-localization objects; and selecting the route from the at least two possible routes based on the respective availabilities of the radar-localization objects for the at least two possible routes;

determining respective quantities or lengths of estimated driver takeover due to insufficient quantities of radar-localization objects for the at least two possible routes, wherein the selecting the route is based further on the respective quantities or lengths of the estimated driver takeover for the at least two possible routes; and maneuvering, by the vehicle, to the destination via the route.

2. The method of claim 1, further comprising determining respective travel times to the destination for the at least two possible routes, wherein the selecting the route is based further on weighted values of the respective quantities or lengths of the estimated driver takeover for the at least two possible routes and the respective travel times to the destination for the possible routes.

3. The method of claim 2, further comprising:

displaying the respective quantities or lengths of the estimated driver takeover and travel times to the destination for the at least two possible routes; and receiving a user input selecting the route from the at least two possible routes, wherein the selecting the route is based further on the user input.

4. The method of claim 1, wherein the respective quantities or lengths of the estimated driver takeover are based on one or more vehicle-specific capabilities.

5. The method of claim 4, wherein the vehicle-specific capabilities include an inertial navigation capability of maintaining lateral and longitudinal localization without accurate radar-localization.

6. The method of claim 4, wherein the vehicle-specific capabilities include a radar capability indicative of an accuracy or operation range of radar-localization of the vehicle.

7. The method of claim 1, further comprising determining a context of the request or respective contexts of the at least two possible routes, the context of the request or respective contexts of the at least two possible routes comprising one or more of respective environments of the at least two possible routes, respective traffic conditions of the at least two possible routes, a time of year, or a time of day, wherein the selecting the route is based further on the context of the request or the respective contexts of the at least two possible routes.

8. The method of claim 1, wherein the maneuvering to the destination comprises maneuvering the vehicle to the destination in an autonomous or semi-autonomous mode.

9. The method of claim 8, wherein the maneuvering to the destination further comprises:

localizing the vehicle to the route based on radar detections of radar- localization objects;

monitoring a radar-localization quality of the localizing;

determining that the radar-localization quality has dropped below a threshold or that the radar-localization quality will drop below the threshold along the route; and performing at least one of:
modifying the route; or
adjusting an operation of a radar module of the vehicle.

10. A system comprising:
at least one processor configured to:
select a route to a destination by at least:

responsive to receiving a request to navigate to the destination, determine at least two possible routes to the destination from a current location of a vehicle;

determine respective availabilities of radar-localization objects for the at least two possible routes, the radar-localization objects having corresponding locations on a map and being usable by the vehicle to localize itself relative to the map via radar reflections from the radar-localization objects;

determine respective quantities or lengths of estimated driver takeover due to insufficient quantities of radar-localization objects for the at least two possible routes;

select the route from the at least two possible routes based on the respective availabilities of the radar-localization objects for the at least two possible routes and the respective quantities or lengths of the estimated driver takeover for the at least two possible routes; and maneuver to the destination via the route.

11. The system of claim 10, wherein:
the processor is further configured to determine respective travel times to the destination for the at least two possible routes; and
the selection of the route is based further on weighted values of the respective quantities or lengths of the estimated driver takeover for the at least two possible routes and the respective travel times to the destination for the possible routes.

12. The system of claim 11, wherein:
the processor is further configured to:
display the respective quantities or lengths of the estimated driver takeover and travel times to the destination for the at least two possible routes; and
receive a user input selecting the route from the at least two possible routes; and
the selection of the route is based further on the user input.

13. The system of claim 10, wherein the respective quantities or lengths of the estimated driver takeover are based on one or more vehicle-specific capabilities.

14. The system of claim 13, wherein the vehicle-specific capabilities include an inertial navigation capability of maintaining lateral and longitudinal localization without accurate radar-localization.

15. The system of claim 13, wherein the vehicle-specific capabilities include a radar capability indicative of an accuracy or operation range of radar-localization of the vehicle.

16. The system of claim 10, wherein:
the processor is further configured to determine a context of the request or respective contexts of the at least two possible routes, the context of the request or respective contexts of the at least two possible routes comprising one or more of respective environments of the at least two possible routes, respective traffic conditions of the at least two possible routes, a time of year, or a time of day; and
the selection of the route is based further on the context of the request or the respective contexts of the at least two possible routes.

17. The system of claim 10, wherein the maneuvering to the destination comprises maneuvering the vehicle to the destination in an autonomous or semi-autonomous mode.

18. The system of claim 17, wherein the maneuvering to the destination further comprises:
localizing the vehicle to the route based on radar detections of radar-localization objects;

monitoring a radar-localization quality of the localizing;
determining that the radar-localization quality has dropped below a threshold or that the radar-localization quality will drop below the threshold along the route; and
performing at least one of:
 modifying the route; or
 adjusting an operation of a radar module of the vehicle.

\* \* \* \* \*